(12) United States Patent
Talarico et al.

(10) Patent No.: US 12,035,363 B2
(45) Date of Patent: Jul. 9, 2024

(54) APPARATUS AND METHOD FOR MULTEFIRE INDUSTRY RELEASE (MFIR)

(71) Applicant: Apple Inc., Cupertino, CA (US)

(72) Inventors: Salvatore Talarico, Sunnyvale, CA (US); Huaning Niu, San Jose, CA (US); Anthony Lee, San Diego, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 419 days.

(21) Appl. No.: 17/269,321

(22) PCT Filed: Aug. 28, 2019

(86) PCT No.: PCT/US2019/048450
§ 371 (c)(1),
(2) Date: Feb. 18, 2021

(87) PCT Pub. No.: WO2020/047020
PCT Pub. Date: Mar. 5, 2020

(65) Prior Publication Data
US 2021/0410184 A1     Dec. 30, 2021

Related U.S. Application Data

(60) Provisional application No. 62/773,828, filed on Nov. 30, 2018, provisional application No. 62/756,019, (Continued)

(51) Int. Cl.
*H04W 74/08* (2009.01)
*H04L 5/00* (2006.01)
(Continued)

(52) U.S. Cl.
CPC ......... *H04W 74/0808* (2013.01); *H04L 5/005* (2013.01); *H04L 5/14* (2013.01); *H04W 16/14* (2013.01)

(58) Field of Classification Search
CPC ............. H04W 74/0808; H04W 16/14; H04W 74/006; H04L 5/005; H04L 5/14; H04L 1/1854
See application file for complete search history.

(56) References Cited

U.S. PATENT DOCUMENTS 10,820,350 B2 * 10/2020 Wang ................. H04W 74/006
2015/0057011 A1 *  2/2015 Di Girolamo .... H04W 72/0446
                                                                455/454
(Continued)

FOREIGN PATENT DOCUMENTS

CN          108141858 A     6/2018
KR      10-2018-0039501 A   4/2018
(Continued)

OTHER PUBLICATIONS

International Search Report dated Dec. 24, 2019 for International Application No. PCT/US2019/048450.
(Continued)

*Primary Examiner* — Steven Hieu D Nguyen
(74) *Attorney, Agent, or Firm* — Eschweiler & Potashnik, LLP

(57) ABSTRACT

Systems, apparatuses, methods, and computer-readable media are provided for a user equipment (UE) device that includes one or more processors configured to determine, based on a DL signal in an LTE-TDD radio frame, that an eNB has assessed, based on a Cat-2 listen before talk (LBT) procedure, that a radio frame is valid; and in response to determining that the radio frame is valid, transmitting a UL burst within a predetermined period of time after a DL burst in the radio frame.

18 Claims, 9 Drawing Sheets

Related U.S. Application Data filed on Nov. 5, 2018, provisional application No. 62/752,248, filed on Oct. 29, 2018, provisional application No. 62/723,704, filed on Aug. 28, 2018.

(51) Int. Cl.
  *H04L 5/14* (2006.01)
  *H04W 16/14* (2009.01)
  *H04W 74/0808* (2024.01)

(56) References Cited

U.S. PATENT DOCUMENTS

| | | | |
|---|---|---|---|
| 2017/0085346 A1* | 3/2017 | Tiirola | H04L 5/0055 |
| 2017/0094681 A1* | 3/2017 | Takeda | H04W 72/23 |
| 2017/0288841 A1 | 10/2017 | Park | |
| 2017/0289869 A1* | 10/2017 | Nogami | H04L 5/0094 |
| 2017/0359808 A1 | 12/2017 | Dinan | |
| 2018/0007667 A1 | 1/2018 | You et al. | |
| 2018/0227936 A1 | 8/2018 | Yerramalli et al. | |
| 2018/0255586 A1* | 9/2018 | Einhaus | H04L 5/00 |
| 2021/0195639 A1* | 6/2021 | Kim | H04W 16/14 |

FOREIGN PATENT DOCUMENTS

| | | |
|---|---|---|
| WO | 2016/182238 A1 | 11/2016 |
| WO | 2016182238 A1 | 11/2016 |
| WO | 2017/196725 A1 | 11/2017 |
| WO | 2017196725 A1 | 11/2017 |
| WO | 2018034485 A1 | 2/2018 |
| WO | 2018075745 A1 | 4/2018 |

OTHER PUBLICATIONS

"SI Transmission in NR-U." Source: Charter Communication. Agenda Item: 7.2.2.4.2. 3GPP TSG RAN WG1 Meetign #94, Gothenburg, Sweden, Aug. 20-25, 2018. R1-1809179.

International Preliminary Report On Patentability dated Mar. 2, 2021 for International Application No. PCT/US2019/048450.

5 GHz RLAN; Harmonised Standard covering the essential requirements of article 3.2 of Directive 2014/53/EU; ETSI EN 301 893 V2.1.1; May 2017.

Chinese Office Action dated Jan. 23, 2024 in connection with Application Serial No. 201980053929.1.

Moe Rahnema; Marcin Dryjanski, Artech; From LTE to LTE-Advanced Pro and 5G; Dec. 31, 2017.

CATT, R3-150226 "Enhancement of eNB Configure Update for notification of AAS action"; 3GPP tsg_ran\WG3_lu, Issue No. TSGR3_87; Jan. 31, 2015.

Chen Qimei, Coexistence, integration and optimization of LTE and WiFi in license-free frequency band; Information Science & Technology; Nov. 15, 2017.

* cited by examiner

DL/UL Configuration 0

DL/UL Configuration 1

DL/UL Configuration 2

DL/UL Configuration 3

DL/UL Configuration 4

DL/UL Configuration 5

HARQ for LTE legacy TDD frame structure

HARQ for LTE MF-Lite

HARQ for LTE legacy TDD frame structure

HARQ for MF-Lite

HARQ for LTE legacy TDD frame structure

HARQ for LTE MF-Lite

APPARATUS AND METHOD FOR MULTEFIRE INDUSTRY RELEASE (MFIR)

CROSS REFERENCE TO RELATED APPLICATIONS

This application is a National Phase entry application of International Patent Application No. PCT/US2019/048450 filed Aug. 28, 2019, which claims priority to U.S. Provisional Patent Application No. 62/723,704 filed on Aug. 28, 2018, entitled "APPARATUS FOR MULTEFIRE (MF)-LITE," which is incorporated herein by reference for all purposes. This application claims priority to U.S. Provisional Patent Application No. 62/752,248 filed on Oct. 29, 2018, entitled "APPARATUS FOR MF-LITE," which is incorporated herein by reference for all purposes. This application claims priority to U.S. Provisional Patent Application No. 62/756,019 filed on Nov. 5, 2018, entitled "APPARATUS FOR MF-LITE," which is incorporated herein by reference for all purposes. This application claims priority to U.S. Provisional Patent Application No. 62/773,828 filed on Nov. 30, 2018, entitled "APPARATUS FOR MF-LITE," and is hereby incorporated by reference in its entirety.

BACKGROUND

Various examples generally may relate to the field of wireless communications.

DETAILED DESCRIPTION

Figure 1:
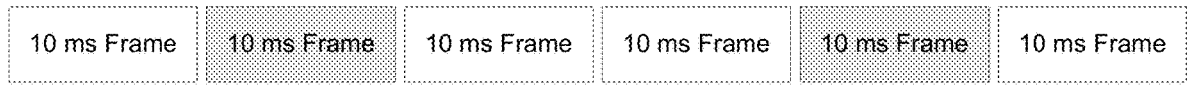
FIG. 1 depicts an exemplary frame-based LTE-TDD listen before talk (LBT) operation in accordance with some examples.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

Multefire (MF) 1.0 is designed based on 3GPP release 13/14 LAA/eLAA. Although the changes to the original specification have been kept minimal, there are still challenges on the implementation on the device side. In this context, the following have been identified as the main challenges: The difficulty in implementing the user equipment (UE's) LBT functionality; the difficulty in implementing the interlaced UL waveform; and the difficulty in implementing the new UE procedures (HARQ, RACH, SR, etc.).

For this reason, the MulteFire Alliance has started a new WI with the aim to create a lighter version of the MF 1.0 so that existing devices can be used without any major implementation change for a timely deployment of this technology. Based on the WI description, MFIR seeks to address consider the following parameters: the simplified version will work mostly on a well control environment, so the presence of Wi-Fi maybe limited, e.g. by channel selection a priori; the simplified version should comply with existing regulations, e.g. ETSI; and some degradation of performance for the simplified version may be expected when compared with current release 1.0, e.g. coverage and/or latency.

Described herein are exemplary overall designs for MFIR, which is based on LTE-TDD based frame structure and enables easier UE implementation in confined environments. The disclosed design for MFIR, which is based on the TDD-LTE frame structure, allows minimum UE modification to meet the regulatory requirements. Another advantage is that if any of the example designs are adopted by the MulteFire specification, it is likely that most of the vendors will implement it in their products for compliance.

Background on 5 GHz Band ETSI Regulation

ETSI EN 301 893 V2.1.3 defines the latest 5 GHz unlicensed band regulatory requirements for the EU. In this disclosure, channel access mechanisms are defined for either load based equipment (LBE), or frame based equipment (FBE). In 3GPP, the LAA/eLAA design has been developed for the channel access procedure that uses load based access. On the other hand, ETSI EN 301 893 V2.1.3, as mentioned above, provides also a set of regulatory requirement for frame based equipment channel access. In this context, the following are the most relevant pieces of regulations:

"Frame Based Equipment shall implement a Listen Before Talk (LBT) based Channel Access Mechanism to detect the presence of other RLAN transmissions on an Operating Channel. Frame Based Equipment is equipment where the transmit/receive structure has a periodic timing with a periodicity equal to the Fixed Frame Period. A single Observation Slot as defined in clause 3.1 and as referenced by the procedure in clause 4.2.7.3.1.4 shall have a duration of not less than 9 μs."

"The Fixed Frame Periods supported by the equipment shall be declared by the manufacturer. See clause 5.4.1, item q). This shall be within the range of 1 ms to 10 ms. Transmissions can start only at the beginning of a Fixed Frame Period. See FIG. 2 below. An equipment may change its Fixed Frame Period but it shall not do more than once every 200 ms."

The first cited section indicates that for FBE channel access, the transmit/receive structure is periodic, and each frame is at most long 10 ms. The second cited section highlights instead that the frame period is generally fixed and can be modified no more than once every 200 ms.

When a system operates in FBE mode, a device can be defined as: i) an "initiating device", which is the device that initiates a sequence of one or more transmissions; ii) a "responding device"; iii) or both.

For an initiating device, its channel access mechanism must comply with the requirements provided in Sec. 4.2.7.3.1.4 of ETSI EN 301 893 V2.1.3, while for a responding device its set of requirements for the channel access are provided in Sec. 4.2.7.3.1.5 of ETSI EN 301 893 V2.1.3. In particular, an initiating device immediately starting transmission within a fixed frame period, shall perform clear channel assessment (CCA). If the channel is clear, the initiating device may transmit immediately. The initiating device is allowed to perform short control signaling transmissions without sensing the channel for the presence of other signals, if within an observation period of 50 ms, the number of Short Control Signalling Transmissions by the equipment shall be equal to or less than 50; and the total duration of the equipment's Short Control Signalling Transmissions shall be less than 2 500 μs within said observation period. Multiple transmissions are permitted within a COT if the gap between transmissions does not exceed 16 us. Otherwise an initiating device may perform CCA before transmission.

The initiating device is allowed to grant authorization to one or more associated responding devices. The channel occupancy time (COT) shall not be greater than 95% of the fixed frame period. Upon correct reception of a packet which was intended for this equipment, the initiating device can skip CCA and immediately proceed with the transmission of management and control frames (e.g. ACK and Block ACK frames). A consecutive sequence of such transmissions by the equipment, without it performing a new CCA, shall not exceed the Maximum Channel Occupancy Time A responding device that received a transmission grant from an associated initiating device may proceed with transmissions on the current operating channel: without performing a CCA if these transmissions are initiated at most 16 μs after the last transmission by the initiating device that issued the grant. A responding device that does not proceed with such transmissions within 16 μs after the last transmission from the initiating device that issued the grant, shall perform a CCA on the operating channel during a single observation slot within a 25 μs period ending immediately before the granted transmission time. If CCA fails, the responding device withdraws the transmission grant, otherwise the responding device may perform transmissions on the current operating channel for the remaining channel occupancy time of the current fixed frame period. In this case, the responding device may have multiple transmissions on this operating channel provided that the gap in between such transmissions does not exceed 16 us. When the transmissions by the responding device are completed the responding device shall withdraw the transmission grant provided by the initiating device.

Similarly as for the LBE, FBE must also comply with the regulatory requirements set regarding the occupied bandwidth, which are summarized here in the following:

"The Occupied Channel Bandwidth shall be between 80% and 100% of the Nominal Channel Bandwidth. In case of smart antenna systems (devices with multiple transmit chains) each of the transmit chains shall meet this requirement. The Occupied Channel Bandwidth might change with time/payload. During a Channel Occupancy Time (COT), equipment may operate temporarily with an Occupied Channel Bandwidth of less than 80% of its Nominal Channel Bandwidth with a minimum of 2 MHz."

Frame Structure Using Frame Based LBT

In one example, the legacy LTE TDD frame structure, which is based on a 10 ms radio frame, becomes the fixed frame period in which the MFIR design operates, as shown in FIG. 1. In this regards, the evolved node B (eNB) will operate as an initiating device, while its associated UEs will operates as the responding devices. In one example, the eNB performs CCA using either type 1 or type 2 LBT (one shot LBT). If the CCA succeeds, the eNB can start transmissions within the radio frame of 10 ms. Otherwise, the eNB drops the entire radio frame, and does not attempt to perform any transmission.

In one example, once the eNB succeeds to perform CCA, it transmits for one or more consecutive subframes, if the transmissions are performed with a gap less than 16 us. In one example, if the eNB creates a gap larger than 16 us, the eNB re-performs CCA, and based on whether this succeeds or fails, the eNB continues to operate within the radio frame, or it drops any transmissions within that radio frame.

In one example, the first N symbols of the first subframe are always used for LBT independently of the frame configuration. In this case, the eNB transmission is postponed of N symbols, and does not start at the subframe boundary. In another example, for the last DL or UL subframe within a radio frame of all TDD configurations, only the first Y OFDM symbols are used for transmissions, while the last X are actually used to create the eNB LBT gap for next frame. As an example, Y=13, and X=1. In this last case, the eNB will always start DL transmission at the frame boundary, similarly as the legacy LTE TDD frame structure (Type 2).

In FIG. 1 the LBT operations occur during the spaces between frames, which correspond to the last symbol of each frame. The grey frames are not transmitted due to LBT failure. In one example, the eNB configures a give frame structure using one of the existing TDD configurations, which are summarized in Table. 1.

TABLE 1

| Configuration | Subframes type | | | | | | | | | |
|---|---|---|---|---|---|---|---|---|---|---|
| 0 | D | S | U | U | U | D | S | U | U | U |
| 1 | D | S | U | U | D | D | S | U | U | U |
| 2 | D | S | U | D | D | D | S | U | D | D |
| 3 | D | S | U | U | U | D | D | D | D | D |

TABLE 1-continued

| Configuration | Subframes type | | | | | | | | | |
|---|---|---|---|---|---|---|---|---|---|---|
| 4 | D | S | U | U | D | D | D | D | D | D |
| 5 | D | S | U | D | D | D | D | D | D | D |
| 6 | D | S | U | U | U | D | S | U | U | D |

Figure 2:
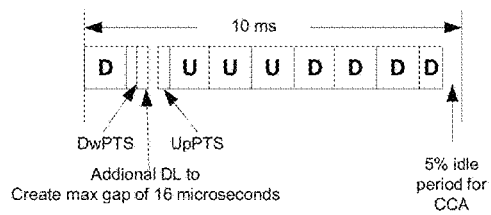
FIG. 2 depicts an exemplary frame structure using TDD configuration 3 in accordance with some examples.
Figure 3A:
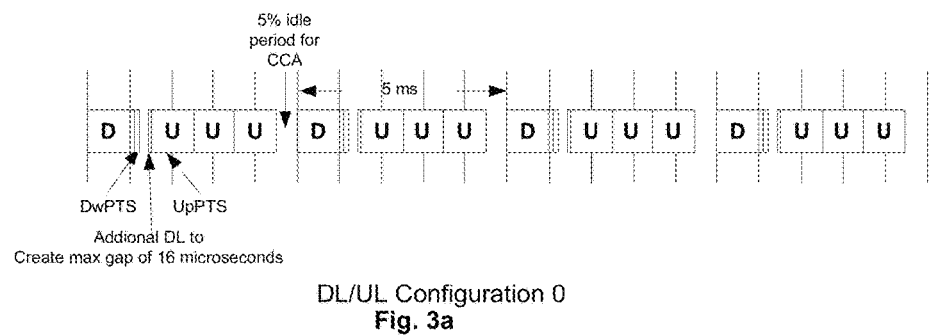
FIGS. 3a-3f illustrates exemplary frame structures using TDD configurations 0-5, respectively, including an enlarged timing advance for UL in accordance with some examples.
Figure 3B:
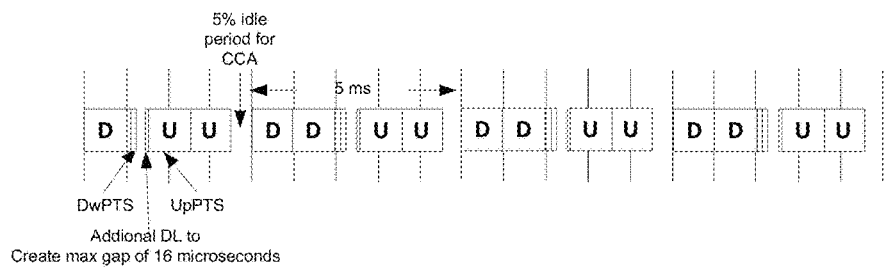
Figure 3C:
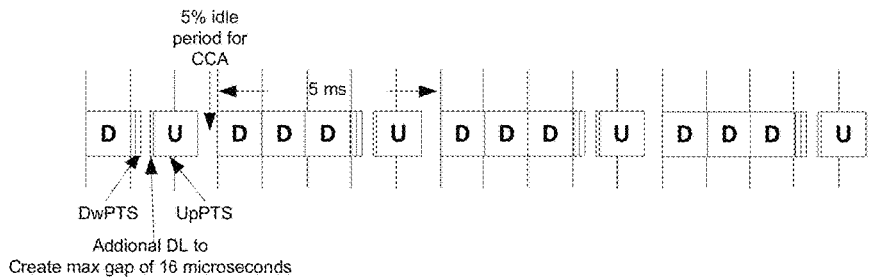
Figure 3D:
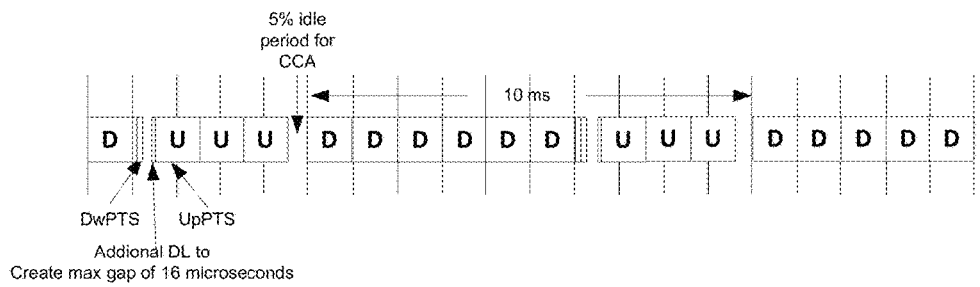
Figure 3E:
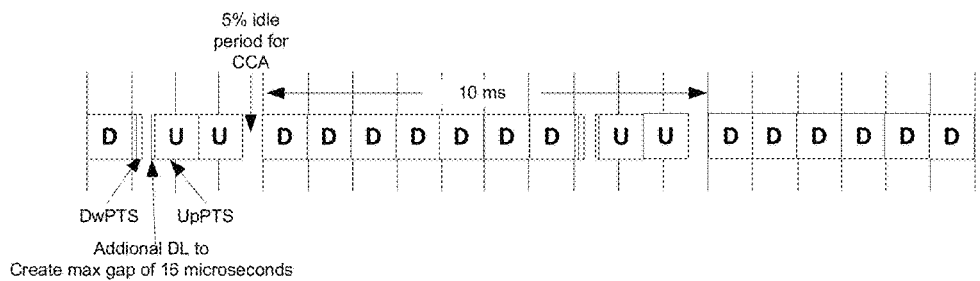
Figure 3F:
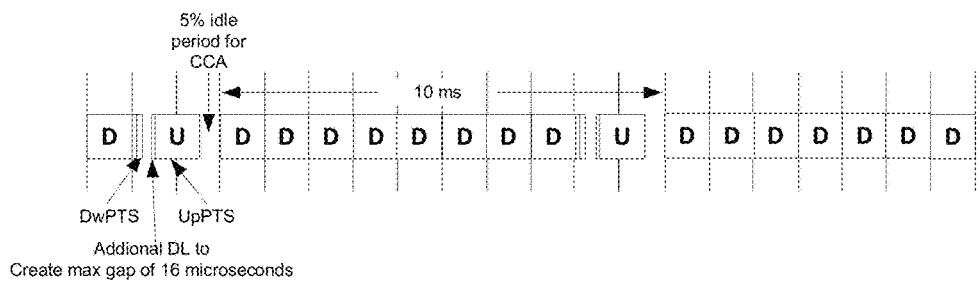

In one example, the structure of the special subframe is modified such that the eNB continues DL transmission until 16 us before the UL transmission time starts, and therefore the guard period must be limited to at most 16 us. This creates only 16 us gap between the DL and UL, so that the UE does not need to perform LBT before it performs a transmission. In one example, the UE only receives and processes the DL transmission configured in the legacy DwPTS of the special subframe and ignores additional DL transmission that is introduced within the special subframe, which is added in order to create a maximum gap between DL and UL of 16 us. FIG. 2 provides an example for TDD configuration 3.

In one example, only one special subframe configuration is used for the MFIR, where the DL transmission after DwPTS is prolonged such that the DL/UL gap is 16 us. In one example, all the legacy special subframe configurations defined in legacy LTE are reused, and modified such that the DwPTS is prolonged such that the DL/UL gap is 16 us. In one example, an additional special subframe configuration is added, where the DwPTS is as long as to create a DL/UL gap of 16 us.

In one example, the UpPTS is used to send RACH, or SRS. In one example, for a UE scheduled to transmit PUSCH in the UL subframes, SRS will be transmitted in the UpPTS.

In one example, a UE performs presence detection at the $1^{st}$ DL subframe of each frame based on CRS, with the aim to know whether the CCA of the eNB has succeeded.

In one example, in order to create a the gap for the eNB to perform LBT, and also to comply with the 5% idle period requirement, a specific timing advance (TA) is applied to UL, and there is no need to puncture either the start or the end of each frame. In one example, depending on whether one or two DL/UL switchings are supported, the frame period is 10 and/or 5 ms long. In one example, if the frame period is 10 ms, then a 0.5 ms common TA is applied to move all UL subframes 0.5 ms forward to create a gap sufficient for DL LBT, otherwise if the frame period is 5 ms, then a 0.25 ms common TA is applied. In order to clarify this concept an illustration for all DL/UL configurations is provided in FIG. 3. In this case, the 10 ms or 5 ms LBT frame starts at the $1^{st}$ DL subframe after UL, and not necessarily from subframe 0 within a radio frame.

In one example, when a 2 DL/UL switching TDD configuration is supported, a 10 ms LBT frame can still be used. The eNB will perform one LBT within 10 ms, and the eNB starts transmission 16 us after the $1^{st}$ DL/UL switching, such that there is no gap between UL and DL. In this case, the type of transmitted signal is up to eNB implementation. The DL subframe starts always at a subframe boundary.

FIGS. 3a-3f. illustrate example frame structure examples that utilize TDD with enlarged TA for UL according to DL/UL configurations 0-5, respectively. In one example, only some limited DL/UL configurations are supported. In one example, if one DL/UL switching is supported, only DL/UL configuration 3, 4 and 5 are supported. In one example, if two DL/UL switchings are supported DL/UL configuration 0, 1 and 2 are supported. In one example, DL/UL configuration 6 is not supported.

In order to support, TA=0.5 if only one DL/UL switching is supported, there is no need to define a new special subframe, but only Special subframe with configurations 0, and 5 are supported (which guarantee a guard period of at least 0.5 ms). In order to support TA=0.25 if two DL/UL switchings are supported there is no need to define a new special subframe, but Special subframe with configuration 0, 1, 2, 5, 6, or 9 are supported (which guarantee a guard period of at least 0.25 ms). In order to guarantee a maximum of 16 us between DL and UL transmission in the special subframe, additional DL transmission is created at the end of the DwPTS to fill up the gap, and reduce it to a maximum of 16 us.

HARQ Timing

For legacy LTE TDD frame structure, Table 10.1.3.1-1 Table 8.3-1, and Table 8.3-2 (which are provided here below) have been introduced in 36.213 to define the DL HARQ, PHICH and the UL HARQ timing, respectively.

TABLE 10.1.3.1-1

| | Downlink association set K: $\{k_0, k_1, \ldots k_{M-1}\}$ for TDD | | | | | | | | | |
|---|---|---|---|---|---|---|---|---|---|---|
| UL/DL | Subframe n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

TABLE 8.3-1

| | k for TDD configurations 0-6 | | | | | | | | | |
|---|---|---|---|---|---|---|---|---|---|---|
| UL/DL | Subframe number i | | | | | | | | | |
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

TABLE 8.3-2 k for TDD configurations 0-6 and UE configured with symPUSCH-UpPts-r14

| UL/DL Configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 5, 4 | | | | 7 | 5, 4 | | | |
| 1 | | 5, 4 | | | 6 | | 5, 4 | | | 6 |
| 2 | | | | 7, 6 | | | | | 7, 6 | |
| 3 | 6 | | | | | | | | 7, 6 | 6 |
| 4 | | | | | | | | | 7, 6 | 6 |
| 5 | | | | | | | | | 7, 6 | |
| 6 | 6, 4 | 4 | | | | 7, 4 | 4 | | | 6 |

Tables 10.1.3.1-1, Table 8.3-1, and Table 8.3-2 provide an indication for each UL/DL configuration for the UL and DL subframe(s) that carry HARQ, to which DL and UL subframe(s) these are related to, respectively.

In one example, the legacy LTE rules and timing relationships can be reused for the MFIR design, with the exception that they apply only to valid radio frames, where a valid radio frame is defined as a radio frame for which the CCA of the eNB has succeeded.

Figure 4:
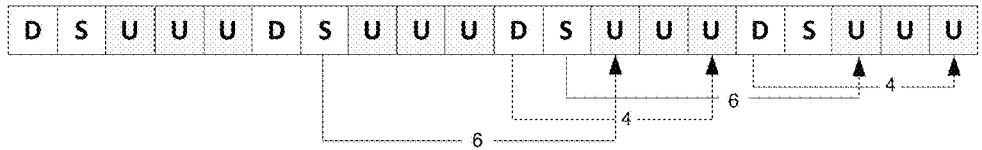
FIG. 4 illustrates exemplary DL HARQ timing using TDD configuration 0.
Figure 4:
Figure 5:
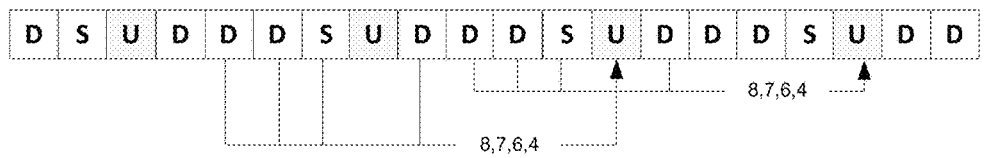
FIG. 5 illustrates exemplary DL HARQ timing using TDD configuration 2.
Figure 5:
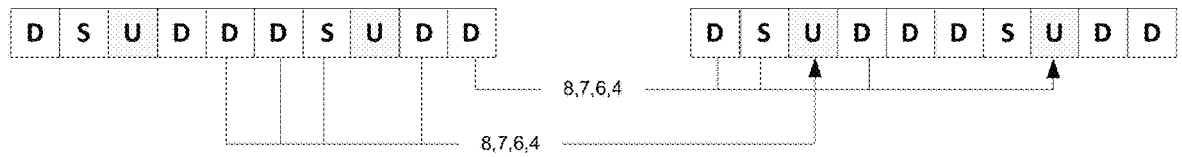

The examples illustrated in FIG. 4 and FIG. 5 show how to apply the TDD table specified in 36.213 for MFIR for the DL HARQ timing. In particular, FIG. 4 and FIG. 5 provide an illustration of both the HARQ timing for legacy-LTE as well for MFIR for a TDD configuration 0 and 2, respectively. FIG. 4 illustrates an example of DL HARQ timing using TDD configuration 0 (UL heavy traffic). FIG. 5 illustrates an example of DL HARQ timing using TDD configuration 2 (DL heavy traffic).

Figure 6:
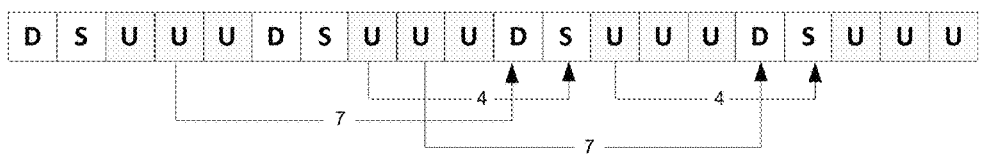
FIG. 6 illustrates exemplary PHICH HARQ timing using TDD configuration 0.
Figure 6:
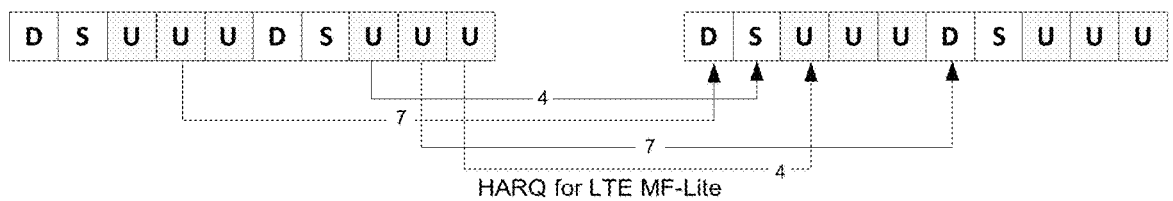
Figure 7:
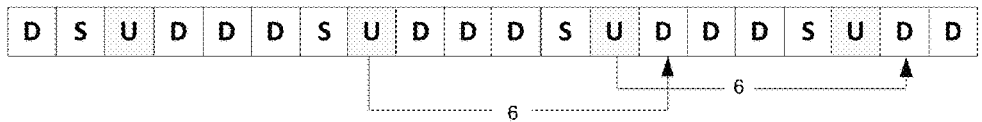
FIG. 7 illustrates exemplary PHICH HARQ timing using TDD configuration 2.
Figure 7:

FIGS. 6 and 7 illustrate PHICH HARQ timing. FIG. 6 illustrates an example of PHICH HARQ timing using TDD configuration 0 (heavy UL traffic). FIG. 7 illustrates an example of PHICH using TDD configuration 2 (heavy DL traffic).

Figure 8:
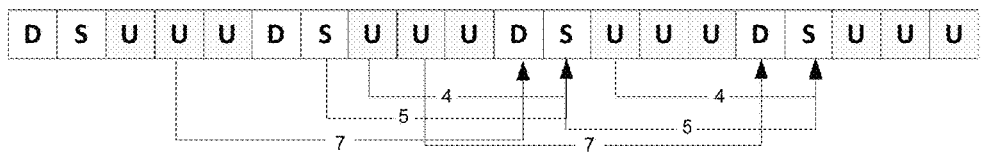
FIG. 8 illustrates exemplary UL HARQ timing using TDD configuration 0.
Figure 8:
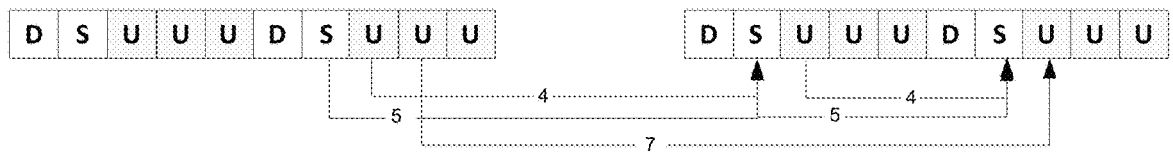
Figure 9:
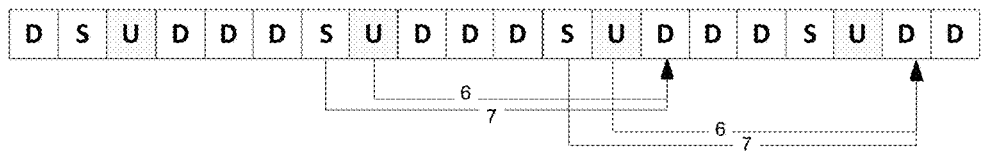
FIG. 9 illustrates exemplary UL HARQ timing using TDD configuration 2.
Figure 9:
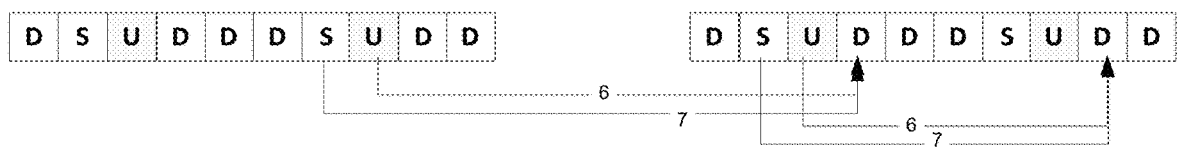

FIGS. 8 and 9 illustrate UL HARQ timing. FIG. 8 illustrates an example of UL HARQ timing using TDD configuration 0 (UL heavy traffic). FIG. 9 illustrates an example of UL HARQ timing using TDD configuration 2 (DL heavy traffic).

Figure 10:
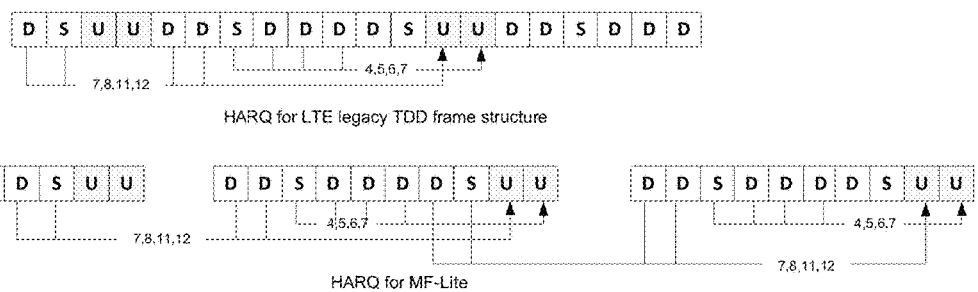
FIG. 10 illustrates exemplary DL HARQ timing using TDD configuration 4.
Figure 11:
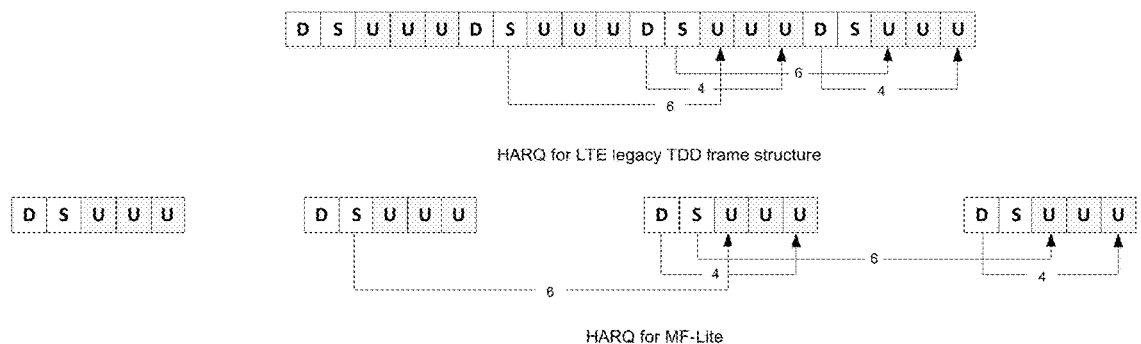
FIG. 11 illustrates exemplary DL HARQ timing using TDD configuration 0.

FIG. 10 illustrates how to apply the TDD table specified in 36.213 for MFIR for the DL HARQ timing in case LBT is applied to first DL subframe. FIG. 10 provides an illustration of both the HARQ timing for legacy-LTE as well for MFIR for a TDD configuration 4, respectively FIG. 11 illustrates how to apply the TDD table specified in 36.213 for MFIR for the DL HARQ timing in case of two switching point and frame period of 5 ms, when the LBT is applied to first DL subframe. In particular, FIG. 11 provides an illustration of both the HARQ timing for legacy-LTE as well for MFIR for a TDD configuration 0, respectively.

Figure 12:
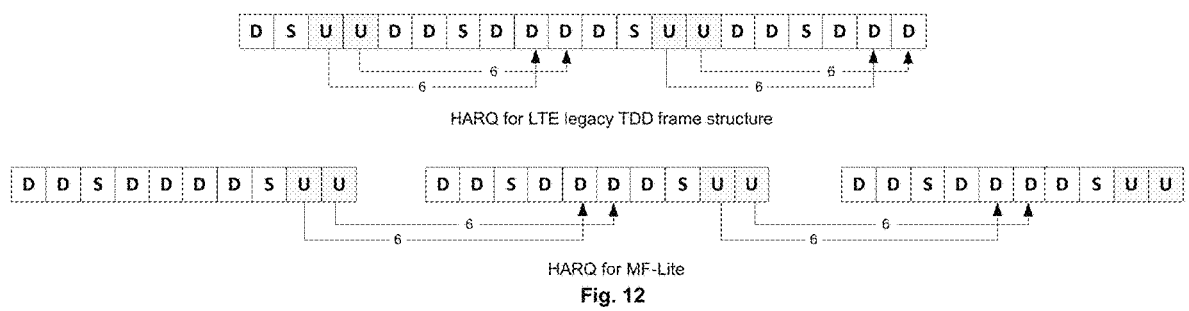
FIG. 12 illustrates exemplary PHICH HARQ timing using TDD configuration 4.
Figure 13:
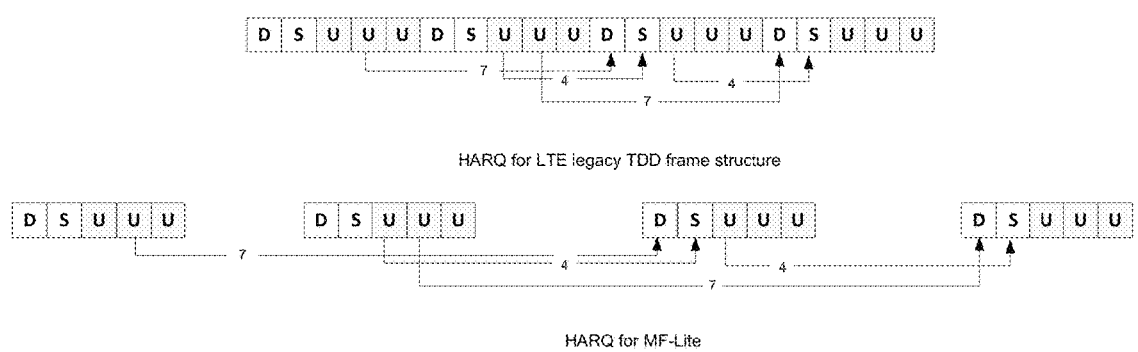
FIG. 13 illustrates exemplary PHICH HARQ timing using TDD configuration 0.

FIGS. 12 and 13 illustrate PHICH HARQ timing. FIG. 12 illustrates an example of PHICH HARQ timing using TDD configuration 4 (UL heavy traffic). FIG. 13 illustrates an example of PHICH HARQ timing using TDD configuration 0.

Figure 14:
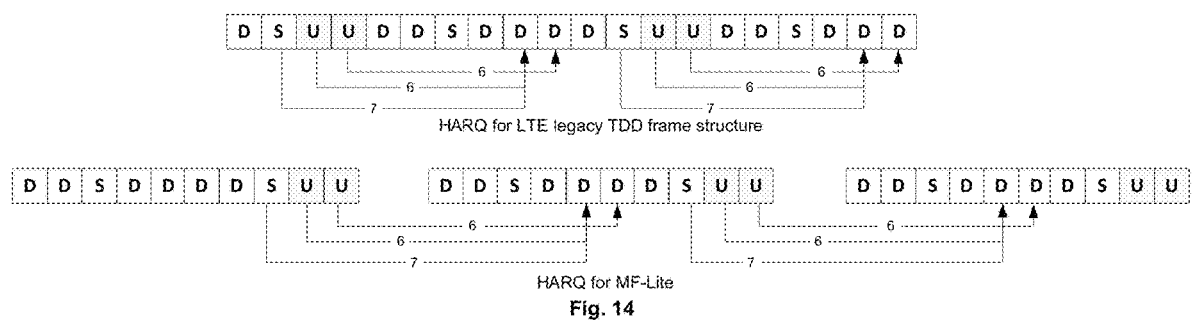
FIG. 14 illustrates exemplary UL HARQ timing using TDD configuration 4.
Figure 15:
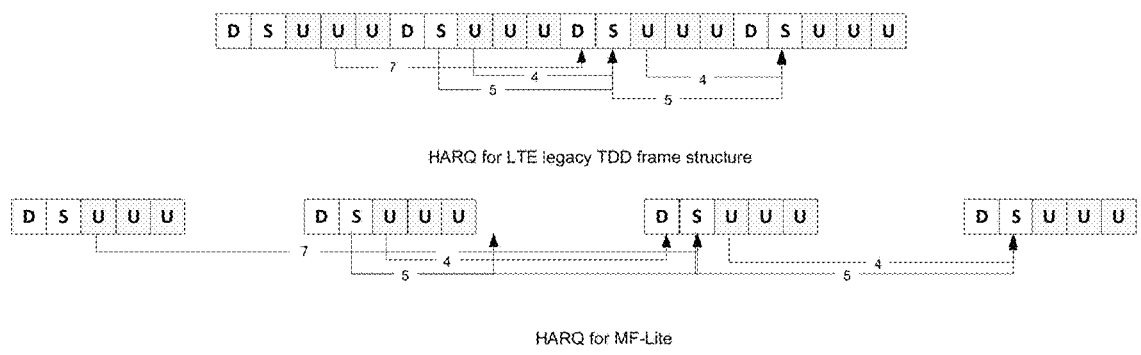
FIG. 15 illustrates exemplary UL HARQ timing using TDD configuration 0.

FIGS. 14 and 15 illustrate UL HARQ timing. FIG. 14 illustrates an example of UL HARQ timing using TDD configuration 4 (UL heavy traffic). FIG. 15 illustrates an example of UL HARQ timing using TDD configuration 0.

Scheduling Procedure

In one example, legacy LTE-TDD scheduling procedure timing is reused, and in this matter in order to comply with the 4 ms constraint between PDCCH and PUSCH, only DL/UL configuration 3, 4, and 5 are used, and scheduling is self-contained.

In one example, in order to enable the use of other DL/UL configurations, such as DL/UL configuration 0, 1, and 2, the legacy LTE-TDD scheduling procedure timing is reused with the exception that they apply only to valid radio frames, where a valid radio frame is a radio frame for which the LBT procedure at the eNB has succeeded.

PUCCH and PRACH Design

Temporary low bandwidth signals such as PUCCH and PRACH may not meet regulatory requirements related to the occupied channel bandwidth (OCB), in which a minimum transmission of 2 MHz is temporarily allowed. As an alternative to the interlace design, which was designed during Rel. 13 LAA with the aim to meet the OCB criteria, frequency hopping could be simply enabled: while the UE hops using a smaller band, in this case the signal is seen by the spectrum analyzer as transmitted over the whole band. For this reason, PUCCH format 1, 2, and 3 meet the requirement over the PUCCH transmission duration (1 ms) when slot based hopping is adopted. In this context, in one example, legacy PUCCH format 1, 2, 3 are supported in MFIR when the slot based frequency hopping is enabled.

Enabling slot-based frequency hopping for PUCCH to meet the OCB requirements requires the OCB to be considered over two aggregated transmissions each one slot long. However, the OCB requirement may need to be met without time aggregation. For this purpose, in one example spatial orthogonal resource transmit diversity (SORTD) is enabled for PUCCH format 1/2 and 3, with the exception of format 1b with channel selection for which SORTD is not allowed.

In one example, in order to meet the OCB requirements the UL control information (UCI) is always carried on PUSCH. In this case, it is up to eNB's implementation to ensure that UCI is always scheduled on PUSCH. In one example, UCI is transmitted either on PUSCH or PUCCH following one or both of the methods disclosed above.

As for the PRACH design, in legacy LTE PRACH spans in frequency domain over 6 resource blocks (RB), and therefore this does not meet the 2 MHz minimum BW requirement. In order to meet the OCB requirements, in one example the legacy PRACH is repeated in frequency domain over the adjacent 6 PRBs.

In another example, the RACH sequence is extended to 12 PRBs. In this matter, a new sequence of length 144 ($M_{sc}^{RS}=144$) is used. In one example, the sequence is generate through a length-139 ($N_{ZC}^{RS}=139$) Zadoff-Chu sequence as follows:

$$\bar{r}_{u,v}(n) = x_q(n \bmod N_{ZC}^{RS}), 0 \leq n < M_{sc}^{RS}$$

where the $q^{th}$ root Zadoff-Chu sequence is defined by $$x_q(m) = e^{-j\frac{\pi qm(m+1)}{N_{ZC}^{RS}}}, 0 \le m \le N_{ZC}^{RS} - 1$$

with $q$ given by $$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

In one example, the legacy LTE PRACH is used, since a regulation exception is applied or PRACH qualifies as a short signalling transmission where the corresponding regulation is interpreted such that OCB does not need to be met for this type of transmission.

In one example, PRACH transmission qualifies as a short control transmission, and it is not subject to any channel access mechanisms, meaning that the UE can perform PRACH transmission within every fixed frame period regardless of whether the eNB has succeeded in performing LBT on it. In this case, in one example the RACH procedure follows the legacy LTE procedure, but transmission is only supported for those UL/DL configurations that are enabled based on the frame structure used. In one example, if the frame structure depicted in FIG. 3 is used, PRACH time/frequency mapping according to UL/DL configuration 6 may is not supported. In one example, if the frame structure depicted in FIG. 3 is used, and the scheduling is agreed to be self contained within a fixed frame period, then PRACH time/frequency mapping according to UL/DL configuration 0, 1, 2, and 6 s not supported.

While PRACH qualifies as a short control signalling, it still must comply with the OCB requirements, and with two additional rules: "within an observation period of 50 ms, the number of Short Control Signalling Transmissions by the equipment shall be equal to or less than 50; and "the total duration of the equipment's Short Control Signalling Transmissions shall be less than 2 500 μs within said observation period."

In order to meet the requirements listed above, in one example only certain PRACH formats are supported. For instance, in one example, only PRACH format 4 is supported. In one example, it is up to UE to ensure that the time resources used for PRACH transmission meet the requirement according with no more than 2.5 ms can be dedicated to PRACH over a period of 50 ms.

DRS, MIB and SIB1 Transmission

In one example, the PSS/SSS/MIB/SIB1 transmission for MFIR follow exactly the same procedure and physical structure as in the LTE legacy TDD-frame structure. In one example, when a frame is dropped due to LBT failure, and if PSS/SSS/MIB/SIB1 were supposed to be transmitted in that frame, they are dropped as well, together with the corresponding redundancy version of MIB and SIB1. In one example, the UE decodes PSS/SSS/MIB or SIB1 in an independent manner. In one example, a UE performs CRS presence detection at each initial subframe (subframe #0) of each radio frame, before combining different RV versions for MIB and SIB transmissions.

In one example, the LTE-legacy MIB content is reused. In one example, the field dl-bandwidth within the MIB is reinterpreted since only 10 and/20 MHz bandwidth are supported.

Figure 16:
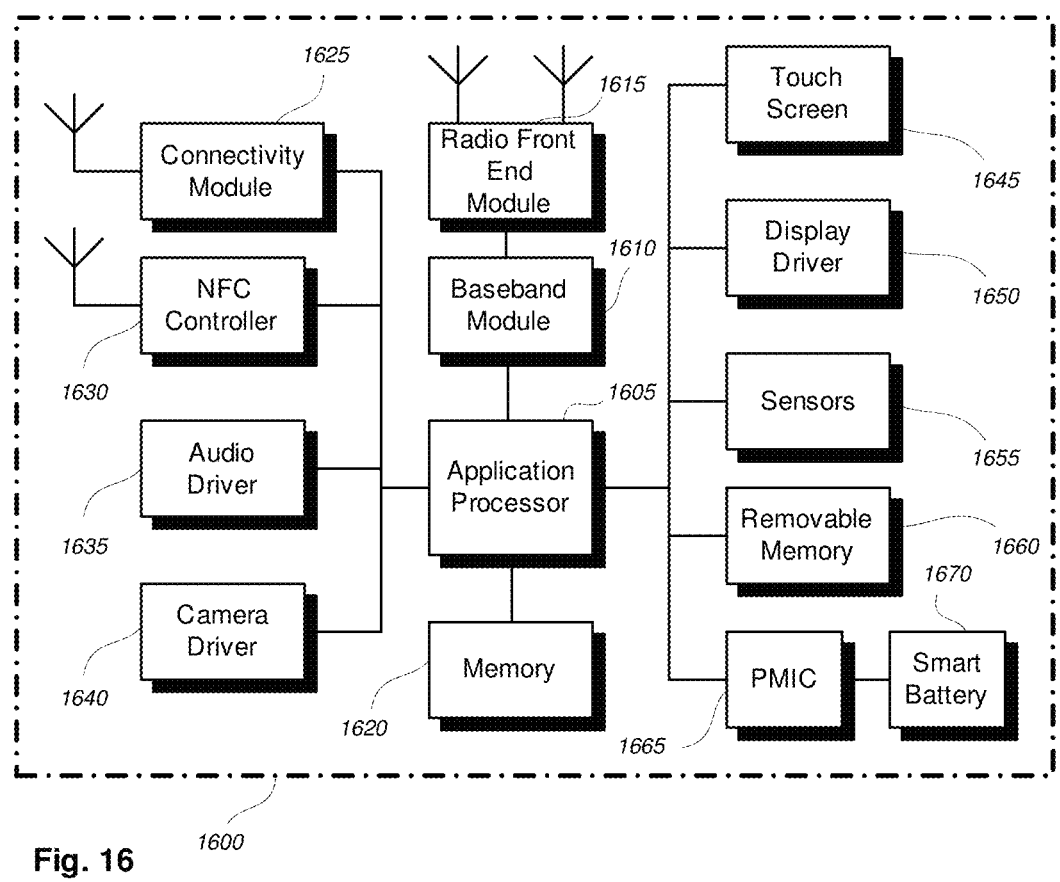
FIG. 16 illustrates a functional block diagram of an exemplary UE device in accordance with some examples.

FIG. 16 illustrates a device 1600 in accordance with an aspect. The user device 1600 may be a mobile device or a UE in some aspects. The device 1600 includes an application processor 1605, baseband processor 1610 (also referred to as a baseband module), radio front end module (RFEM) 1615 (also referred to as a radio interface), memory 1620, connectivity module 1625, near field communication (NFC) controller 1630, audio driver 1635, camera driver 1640, touch screen 1645, display driver 1650, sensors 1655, removable memory 1660, power management integrated circuit (PMIC) 1665 and smart battery 1670.

In some aspects, application processor 1605 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 1610 may be implemented, for example, as a solder-down substrate including one or more integrated circuits, a single packaged integrated circuit soldered to a main circuit board, and/or a multi-chip module containing two or more integrated circuits.

Figure 17:
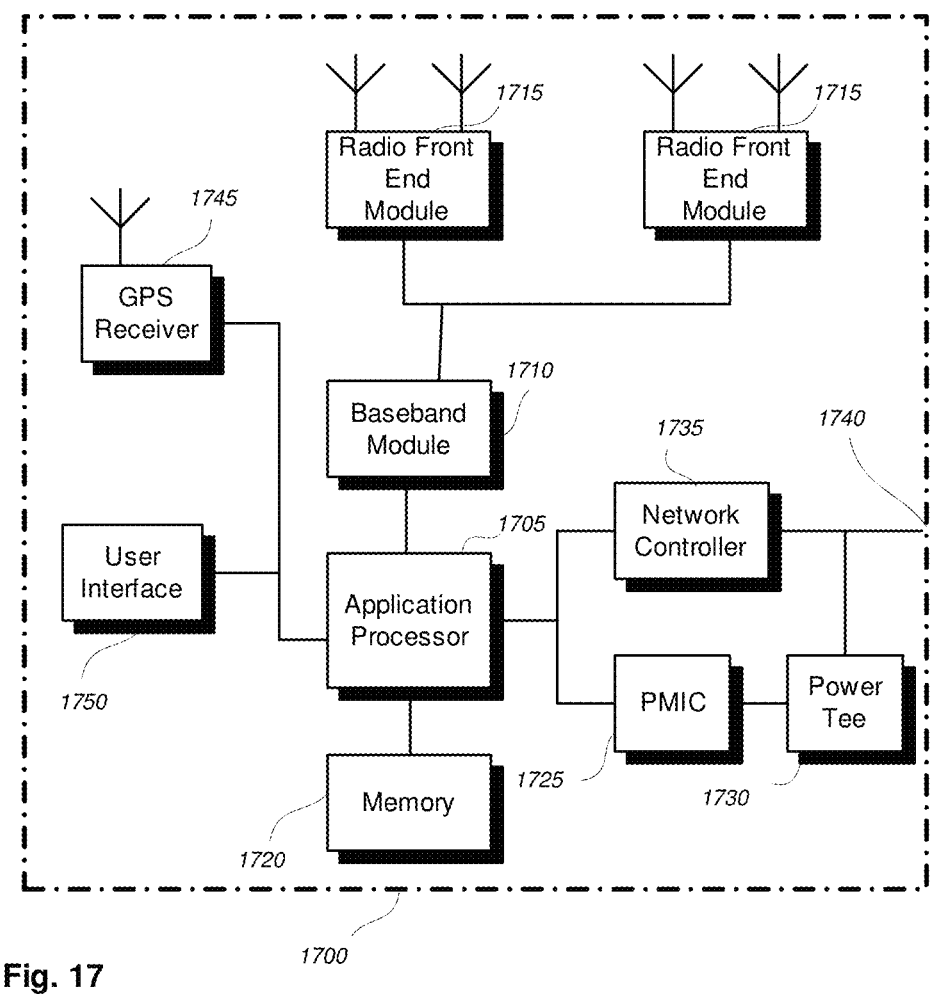
FIG. 17 illustrates a functional block diagram of an exemplary eNB device in accordance with some examples.

FIG. 17 illustrates an example base station or eNB 1700 in accordance with an aspect. The eNB 1700 may include one or more of application processor 1705, baseband modules 1710 (also referred to as baseband processors), one or more radio front end modules 1715 (also referred to as a radio interface), memory 1720, power management circuitry 1725, power tee circuitry 1730, network controller 1735, network interface connector 1740, satellite navigation receiver module 1745, and user interface 1750.

In some aspects, application processor 1705 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 1710 may be implemented, for example, as a solder-down substrate including one or more integrated circuits, a single packaged integrated circuit soldered to a main circuit board or a multi-chip module containing two or more integrated circuits.

In some aspects, memory 1720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 1720 may be implemented as one or more of solder down packaged integrated circuits, socketed memory modules and plug-in memory cards.

In some aspects, power management integrated circuitry 1725 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 1730 may provide for electrical power drawn from a network cable to provide both power supply and data connectivity to the base station radio head 1700 using a single cable.

In some aspects, network controller 1735 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 1745 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 1745 may provide data to application processor 1705 which may include one or more of position data or time data. Application processor 1705 may use time data to synchronize operations with other radio base stations.

In some aspects, user interface 1750 may include one or more of physical or virtual buttons, such as a reset button, one or more indicators such as light emitting diodes (LEDs) and a display screen.

For one or more examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 is an apparatus for a user equipment (UE) device, including baseband circuitry having a radio frequency (RF) interface configured to receive downlink (DL) signals and transmit uplink (UL) signals during a succession of long-term evolution (LTE)—time division duplex (TDD) radio frames, and one or more processors configured to: determine, based on a DL signal in a radio frame, that an eNB has assessed, based on a Cat-2 listen before talk (LBT) procedure, that a radio frame is valid; and in response to determining that the radio frame is valid, transmitting a UL burst within a predetermined period of time after a DL burst in the radio frame.

Example 2 includes the subject matter of example 1, including or omitting optional subject matter, wherein the one or more processors are configured to determine that the eNB has determined that the radio frame is valid by, in a first DL subframe of a LTE-TDD radio frame, detecting a presence of a signal indicative of an eNB transmitting a DL signal to the UE, further wherein a fixed frame period within the radio frame begins with a DL burst and ends with a UL burst independent of a radio frame structure.

Example 3 includes the subject matter of example 2, including or omitting optional subject matter, wherein the signal indicative of the eNB transmitting the DL signal includes a cell-specific reference signal (CRS).

Example 4 includes the subject matter of any one of examples 1-3, including or omitting optional subject matter, wherein the one or more processors are configured to begin transmission of the UL burst at an uplink pilot timeslot (UpPTS) boundary.

Example 5 includes the subject matter of any one of examples 1-3, including or omitting optional subject matter, wherein the one or more processors are configured to process the DL signal in a downlink pilot timeslot (DwPTS) of the radio frame and refrain from processing the DL signal following the DwPTS prior to beginning transmission of the UL burst.

Example 6 includes the subject matter of any one of examples 1-3, including or omitting optional subject matter, wherein the one or more processors are configured to advance a timing of the UL burst to create an interval at an end of the UL burst during which an eNB performs a listen before talk (LBT) operation.

Example 7 includes the subject matter of example 6, including or omitting optional subject matter, wherein when the LTE-TDD radio frame is configured with DL/UL configuration 3, 4, 5, or 6, further wherein the one or more processors are configured to advance a timing of the UL burst by approximately 0.5 ms.

Example 8 includes the subject matter of example 6, including or omitting optional subject matter, wherein when the LTE-TDD radio frame is configured with DL/UL configuration 0, 1, or 2, further wherein the one or more processors are configured to advance a timing of the UL burst by approximately 0.25 ms.

Example 9 is an apparatus for an evolved node B (eNB) device, including baseband circuitry having a radio frequency (RF) interface configured to receive uplink (UL) signals and transmit downlink (DL) signals during a succession of LTE-TDD radio frames, and one or more processors configured to: performing a Cat-2 listen before talk (LBT) operation on an unlicensed channel during a radio frame; and in response to determining that the unlicensed channel is clear, transmitting, within a predetermine time period, a DL burst to a user equipment device (UE) in one or more radio frames.

Example 10 includes the subject matter of example 9, including or omitting optional subject matter, wherein the one or more processors are configured to perform the Cat-2 LBT operation according to a frame-based LBT procedure specified in European Telecommunication Standards Institute (ETSI) regulatory requirements.

Example 11 includes the subject matter of example 9, including or omitting optional subject matter, wherein the one or more processors are configured to drop a radio transmission in response to determining that the unlicensed channel is not clear.

Example 12 includes the subject matter of any one of examples 9-11, including or omitting optional subject matter, wherein the one or more processors are configured to continue to transmit the DL signal beyond a downlink pilot timeslot (DwPTS) of the radio frame to create a gap corresponding to the predetermined time period.

Example 13 includes the subject matter of any one of examples 9-11, including or omitting optional subject matter, wherein the one or more processors are configured to extend a downlink pilot timeslot (DwPTS) of the radio frame to create a maximum guard interval corresponding to the predetermined time period.

Example 15 includes the subject matter of any one of examples 9-11, including or omitting optional subject matter, wherein the one or more processors are configured to configure a special subframe for the radio frame that includes a guard interval corresponding to the predetermined time period.

Example 15 includes the subject matter of any one of examples 9-11, including or omitting optional subject matter, wherein the one or more processors are configured to transmit subframes corresponding to an LBT frame starting at a first DL frame after an UL frame in the radio frame, such that alignment of transmission of the LBT frame is independent of a first subframe of the radio frame.

Example 16 includes the subject matter of any example 15, including or omitting optional subject matter, wherein the LBT frame has a duration of 10 ms.

Example 17 includes the subject matter of any example 16, including or omitting optional subject matter, wherein the one or more processors are configured to: select an LTE-TDD UL/DL configuration of 3, 4, or 5; and configure a timing advance for UL transmission of 0.5 ms.

Example 18 includes the subject matter of any example 16, including or omitting optional subject matter, wherein the one or more processors are configured to select a LTE-TDD special subframe configuration of 0 or 5.

Example 19 includes the subject matter of any example 16, including or omitting optional subject matter, wherein the one or more processors are configured to: select an LTE-TDD UL/DL configuration 6; and perform an LBT operation every 5 ms during the radio frame after an end of each UL burst; configure a timing advance for UL transmission of 0.5 ms; and begin transmission of a DL signal the predetermined time period after a first DL/UL switching, such that there is no gap between the UL burst and the DL signal.

Example 20 includes the subject matter of any example 15, including or omitting optional subject matter, wherein the LBT frame has a duration of 5 ms.

Example 21 includes the subject matter of any example 20, including or omitting optional subject matter, wherein the one or more processors are configured to: select an LTE-TDD UL/DL configuration of 0, 1, or 2; configure a timing advance for UL transmission of 0.25 ms; and perform an LBT operation every 5 ms during the radio frame after an end of each UL burst.

Example 22 includes the subject matter of any example 20, including or omitting optional subject matter, wherein the one or more processors are configured to select a LTE-TDD special subframe configuration of 0, 1, 5, or 9.

Example 23 includes the subject matter of any example 15, including or omitting optional subject matter, wherein the one or more processors are configured to begin transmission of the DL burst at a subframe boundary.

Example 24 includes the subject matter of any example 15, including or omitting optional subject matter, wherein the one or more processors are configured to control DL and UL transmission such that no more than 95% of the radio frame are occupied by DL signals or UL signals.

Example 25 is an apparatus for a user equipment (UE) device, including baseband circuitry having a radio frequency (RF) interface configured to receive downlink (DL) signals and transmit uplink (UL) signals during a succession of LTE-TDD radio frames, and one or more processors configured to: determine that a UL signal for transmission is a temporary low bandwidth signal; and in response to determining that the UL signal is a temporary low bandwidth signal, transmitting the UL signal in a manner that meets an occupied channel bandwidth OCB specified by European Telecommunication Standards Institute (ETSI) regulatory requirements.

Example 26 includes the subject matter of any example 25, including or omitting optional subject matter, wherein the temporary low bandwidth signal includes a physical uplink control channel (PUCCH) signal.

Example 27 includes the subject matter of any example 26, including or omitting optional subject matter, wherein the one or more processors are configured to perform slot-based frequency hopping while transmitting the UL signal.

Example 28 includes the subject matter of any example 26, including or omitting optional subject matter, wherein the one or more processors are configured to enable spatial orthogonal resource transmit diversity (SORTD) for transmitting the UL signal according to PUCCH format 1a, 2, or 3.

Example 29 includes the subject matter of any one of examples 25-28, including or omitting optional subject matter, wherein the UL signal includes UL control information (UCI).

Example 30 includes the subject matter of example 29, including or omitting optional subject matter, wherein the one or more processors are configured to transmit the UCI via a physical uplink shared channel (PUSCH).

Example 31 includes the subject matter of any one of examples 25-28, including or omitting optional subject matter, wherein the temporary low bandwidth signal includes a physical random access channel (PRACH) signal.

Example 32 includes the subject matter of example 31, including or omitting optional subject matter, wherein the one or more processors are configured to extend the UL signal to 12 physical resource blocks (PRBs).

Example 33 includes the subject matter of example 32, including or omitting optional subject matter, wherein the one or more processors are configured to repeat, in the frequency domain, a legacy PRACH signal having 6 PRBs to extend the legacy PRACH signal to 12 PRBs.

Example 34 includes the subject matter of example 32, including or omitting optional subject matter, wherein the one or more processors are configured to generate a 144 element PRACH signal using a 139 element Zadoff-Chu (ZC) sequence.

Example 35 includes the subject matter of any one of examples 25-28, including or omitting optional subject matter, wherein the one or more processors are configured to transmit the UL signal independent of a determination that a listen before talk (LBT) operation performed by an eNB on the radio frame indicates that a channel of the radio frame is not clear.

Example 36 includes the subject matter of any one of examples 25-28, including or omitting optional subject matter, wherein the one or more processors are configured to transmit the UL signal according to a PRACH format 4.

Example 37 is an apparatus for a user equipment (UE) device, including baseband circuitry having a radio frequency (RF) interface configured to receive downlink (DL) signals and transmit uplink (UL) signals during a succession of LTE-TDD radio frames, and one or more processors configured to detect physical broadcast channel (PBCH) signals and system information block type 1 (SIB1) signals in an independent manner from one radio frame to another.

Example 38 includes the subject matter of example 37, including or omitting optional subject matter, wherein the one or more processors are configured to perform cell specific signal (CRS) presence detection in subframe 0 of the radio frame, and in response to detecting CRS, combining different redundancy versions of master information block (MIB) signals and system information block (SIB) signals.

Example 39 includes the subject matter of example 37, including or omitting optional subject matter, wherein the one or more processors are configured to re-interpret information in a dl-bandwidth field of legacy LTE-TDD MIB to correspond to either 10 MHz or 20 MHz.

Example 40 is an apparatus for an evolved node B (eNB) device, including baseband circuitry having a radio frequency (RF) interface configured to receive uplink (UL) signals and transmit downlink (DL) signals during a succession of LTE-TDD radio frames, and one or more processors configured to determine timing of hybrid automatic repeat request (HARQ) signals accounting for valid listen before talk (LBT) radio frames and not accounting for invalid LBT radio frames, wherein a valid LBT radio frame includes a radio frame for which a channel is determined clear based on an LBT operation performed by the eNB.

Example 41 includes the subject matter of example 40, including or omitting optional subject matter, wherein the one or more processors are configured to determine the timing of HARQ signals for DL signals and UL signals based on valid DL/UL subframes, wherein valid DL/UL subframes include DL/UL subframes within a valid LBT radio frame.

Any of the above described examples may be combined with any other example (or combination of examples), unless explicitly stated otherwise. The foregoing description of one or more implementations provides illustration and description, but is not intended to be exhaustive or to limit the scope of examples to the precise form disclosed. Modifications and variations are possible in light of the above teachings or may be acquired from practice of various examples.

We claim:

1. A user equipment (UE), comprising:
   a memory; and
   baseband circuitry comprising
      a radio frequency (RF) interface configured to receive downlink (DL) signals and transmit uplink (UL) signals during a succession of long-term evolution (LTE)—time division duplex (TDD) radio frames, and
   one or more processors configured to, when executing instructions stored in the memory, cause the UE to:
      determine, based on a DL signal in a radio frame, that an eNB has assessed, based on a Cat-2 listen before talk (LBT) procedure, that a radio frame is valid; and
      in response to determining that the radio frame is valid, without performing an LBT procedure, transmit, by way of the RF interface, a UL burst with a timing advance within a predetermined period of time after a DL burst in the radio frame, wherein the timing advance creates an interval at an end of a UL signal during which an eNB performs a LBT operation,
      process the DL signal in a downlink pilot timeslot (DwPTS) of the radio frame and refrain from processing an additional DL signal following the DwPTS in the same subframe and prior to a guard period preceding the UL burst, wherein a length of the guard period does not exceed 16 us.

2. The UE of claim 1, wherein the one or more processors are configured to determine that the eNB has determined that the radio frame is valid by, in a first DL subframe of a LTE-TDD radio frame, detecting a presence of a signal indicative of an eNB transmitting a DL signal to the UE, further wherein a fixed frame period within the radio frame begins with a DL burst and ends with a UL burst independent of a radio frame structure.

3. The UE of claim 2, wherein the signal indicative of the eNB transmitting the DL signal comprises a cell-specific reference signal (CRS).

4. UE of claim 1, wherein the one or more processors are configured to cause transmission of the UL burst beginning at an uplink pilot timeslot (UpPTS) boundary.

5. UE of claim 1, wherein the timing advance is 0.25 ms for a 5 ms frame period or the timing advance is 0.5 ms for a 10 ms frame period.

6. The UE of claim 1, wherein the one or more processors are configured to send UL data using a Physical Random Access Channel (PRACH), wherein the PRACH comprises 12 resource blocks.

7. The UE of claim 1, wherein the one or more processors are configured to send UL data using a legacy LTE PRACH that spans over 6 resource blocks, and wherein the UL data is repeated over adjacent 6 resource blocks.

8. The UE of claim 1, wherein UL control information is carried on PUSCH.

9. An apparatus for an evolved node B (eNB) device, comprising baseband circuitry having a radio frequency (RF) interface configured to receive uplink (UL) signals and transmit downlink (DL) signals during a succession of LTE-TDD radio frames, and one or more processors configured to:
   performing a Cat-2 listen before talk (LBT) operation on an unlicensed channel during a radio frame; and
   in response to determining that the unlicensed channel is clear, transmitting, within a predetermined time period, a DL burst to a user equipment device (UE) in one or more radio frames, wherein the one or more processors are configured to transmit subframes corresponding to an LBT frame starting at a first DL frame after an UL frame in the radio frame, such that alignment of transmission of the LBT frame is independent of a first subframe of the radio frame, wherein the one or more processors are configured to continue to transmit an additional DL signal beyond a downlink pilot timeslot (DwPTS) and prior to a guard period of the radio frame to create a gap corresponding to the predetermined time period, wherein the guard period has a maximum length of 16 us, further wherein the LBT frame has a duration of 5 ms, wherein the one or more processors are configured to:
   select an LTE-TDD UL/DL configuration of 0, 1, or 2;
   configure a timing advance for UL transmission of 0.25 ms; and
   perform an LBT operation every 5 ms during the radio frame after an end of each UL burst.

10. The apparatus of claim 9, wherein the one or more processors are configured to drop a radio transmission in response to determining that the unlicensed channel is not clear.

11. The apparatus of claim 9, wherein the LBT frame has a duration of 10 ms.

12. The apparatus of claim 11, wherein the one or more processors are configured to:
   select an LTE-TDD UL/DL configuration of 3, 4, or 5; and
   configure a timing advance for UL transmission of 0.5 ms.

13. The apparatus of claim 11, wherein the one or more processors are configured to select a LTE-TDD special subframe configuration of 0 or 5.

14. The apparatus of claim 11, wherein the one or more processors are configured to:
   select an LTE-TDD UL/DL configuration 6; and
   perform an LBT operation every 5 ms during the radio frame after an end of each UL burst;
   configure a timing advance for UL transmission of 0.5 ms; and
   begin transmission of a DL signal the predetermined time period after a first DL/UL switching, such that there is no gap between the UL burst and the DL signal.

15. The apparatus of claim 9, wherein the one or more processors are configured to select a LTE-TDD special subframe configuration of 0, 1, 5, or 9.

16. The apparatus of claim 9, wherein the one or more processors are configured to begin transmission of the DL burst at a subframe boundary.

17. The apparatus of claim 9, wherein the eNB device receives a UpPTS after the guard period.

18. The apparatus of claim 17, wherein the UpPTS is in the same subframe as the guard period.

* * * * *